United States Patent [19]

Stockton

[11] 3,986,413
[45] Oct. 19, 1976

[54] FOUR-SPEED AUTOMATIC COUPLING TRANSMISSION

[75] Inventor: Thomas R. Stockton, Ann Arbor, Mich.

[73] Assignee: Ford Motor Company, Dearborn, Mich.

[22] Filed: July 3, 1975

[21] Appl. No.: 593,079

[52] U.S. Cl. .................................. 74/688; 74/695; 74/762

[51] Int. Cl.² .................. F16H 47/08; F16H 37/08; F16H 57/10

[58] Field of Search ............. 74/688, 695, 762, 763

[56] References Cited
UNITED STATES PATENTS

| | | | |
|---|---|---|---|
| 2,737,827 | 3/1956 | Seybold | 74/762 X |
| 3,008,349 | 11/1961 | Winchell et al. | 74/688 |
| 3,025,721 | 3/1962 | De Lorean | 74/688 |
| 3,106,107 | 10/1963 | Hardy | 74/688 |
| 3,250,150 | 5/1966 | Stockton | 74/688 |
| 3,270,585 | 9/1966 | Livezey | 74/688 X |
| 3,292,454 | 12/1966 | Konrad et al. | 74/695 X |
| 3,424,031 | 1/1969 | Stockton | 74/695 |
| 3,541,886 | 11/1970 | Bookout | 74/763 |
| 3,614,902 | 10/1971 | Candellero | 74/763 X |
| 3,800,626 | 4/1974 | Koivunen | 74/695 |

Primary Examiner—Samuel Scott
Assistant Examiner—Lance W. Chandler
Attorney, Agent, or Firm—Donald J. Harrington; Keith L. Zerschling

[57] ABSTRACT

A four-speed planetary transmission mechanism for an automotive vehicle including two simple planetary gear units and a fluid coupling, the latter being used to transmit torque during operation in the two lowest ratios, the torque delivery path through the mechanism during direct-drive fourth speed ratio operation being a split torque drive and the torque delivery path during third speed ratio operation being fully mechanical.

12 Claims, 6 Drawing Figures

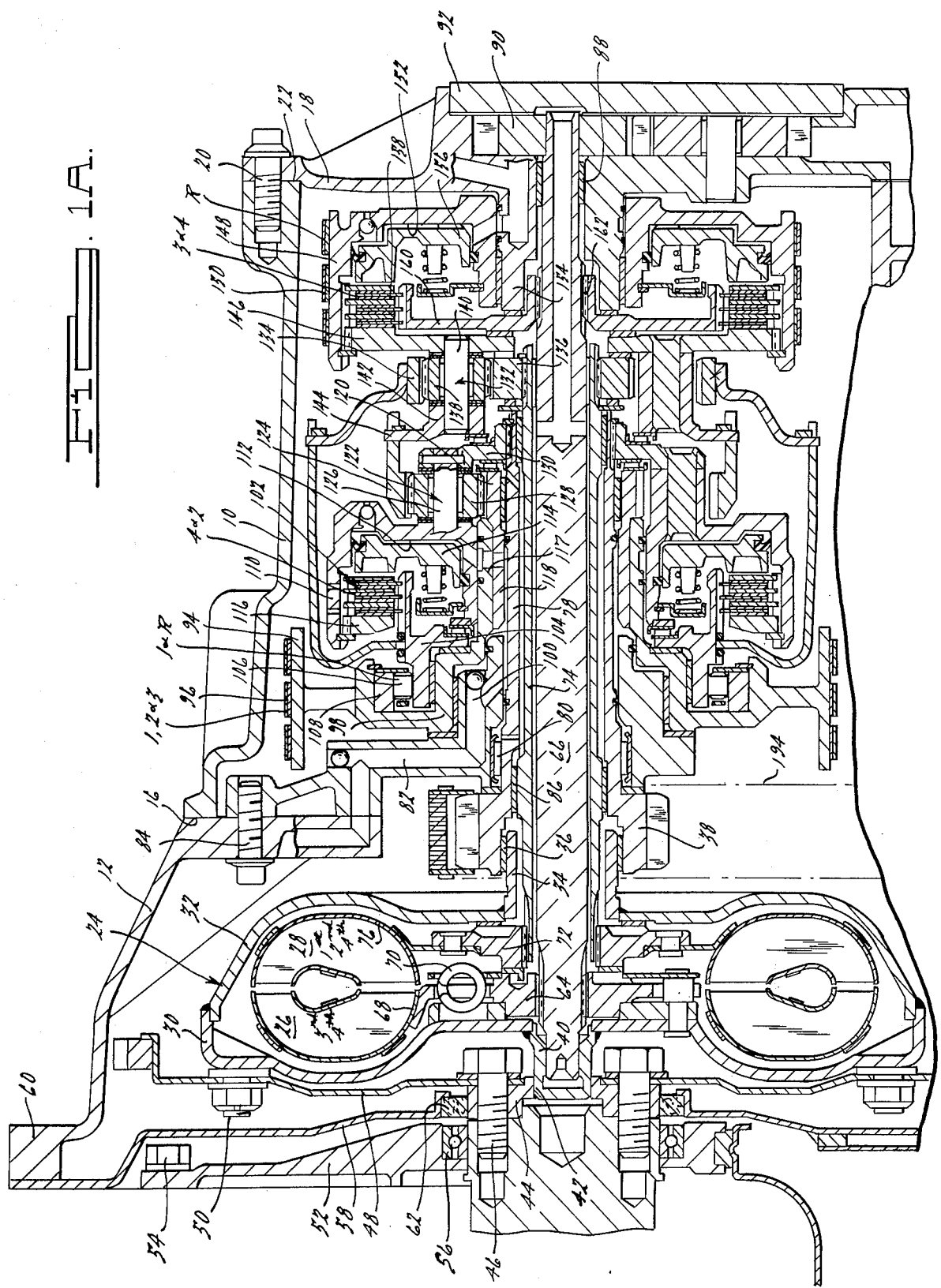

| | | | Typical Ratios |
|---|---|---|---|
| Coupling | (1) | $\left(1 + \dfrac{R_2}{S_2}\right)\left(1 + \dfrac{S_1}{R_1}\right)$ | 4.36 |
| Coupling | (2) | $\left(1 + \dfrac{R_2}{S_2}\right)\left(1 + \dfrac{S_1}{R_1}\right) - \dfrac{R_2}{S_2}$ | 2.52 |
| Solid | (3) | $\left(1 + \dfrac{S_1}{R_1}\right)$ | 1.55 |
| Split | (4) | Direct | 1 |
| Coupling | (Rev.) | $-\dfrac{R_2}{S_2}\left(1 + \dfrac{R_1}{S_1}\right)$ | $-5.27$ |

Legend — $\omega$ = Rotational Velocity Vector
a = Flow Vector Along Blade
b = Rotational Vector
c = Absolute Flow Velocity Vector
d = Tangential Velocity Component
Flow = Torus Flow

FOUR-SPEED AUTOMATIC COUPLING TRANSMISSION

BRIEF DESCRIPTION OF THE INVENTION

The improved transmission of my invention is adapted to be used in the driveline of an automotive vehicle engine. It is characterized by four relatively evenly spaced ratio steps from a low speed ratio to a direct-drive, high speed ratio. It is adaptable because of the extra forward driving ratio for use with automotive vehicle drivelines that include a low torque engine.

The transmission mechanism includes two simple planetary gear units arranged in a novel combination. The ratios for the gearing units are controlled by only four friction clutch-and-brake elements and a single overrunning clutch. In addition, a fluid coupling is included in the torque delivery path for the first and the second speed ratio as well as in the fourth speed ratio. All of the engine torque is delivered through the coupling during operation in the first and second speed ratio but only a part of the engine torque is delivered to the fluid coupling during operation in direct-drive, a fourth speed ratio, which is the driving condition for the major part of the total operating time. Hydrokinetic loses in efficiency because of the presence of the fluid coupling thus are minimized although the smoothness and the infinitely variable speed ratio characteristic achieved by the use of a fluid coupling is retained.

The gearing ratios that are available during start-up conditions are sufficiently high so that the overall driving ratio for the driveline is adequate notwithstanding the fact that the fluid coupling operates at a 1:1 torque ratio. The ratios that are available for acceleration purposes thus are comparable to the ratios available with hydrokinetic torque converter transmissions with three ratio steps, which are commonly used in the automotive industry.

The design characteristics of this transmission mechanism contribute to reduce manufacturing costs as well as to improve the operating efficiency. This is achieved while retaining the usual acceleration smoothness characteristic of hydrokinetic transmissions.

BRIEF DESCRIPTION OF THE FIGURES OF THE DRAWINGS

FIG. 1A shows in longitudinal cross-sectional form the coupling and gearing arrangement of my invention;

PARTICULAR DESCRIPTION OF THE INVENTION

Figure 1B:
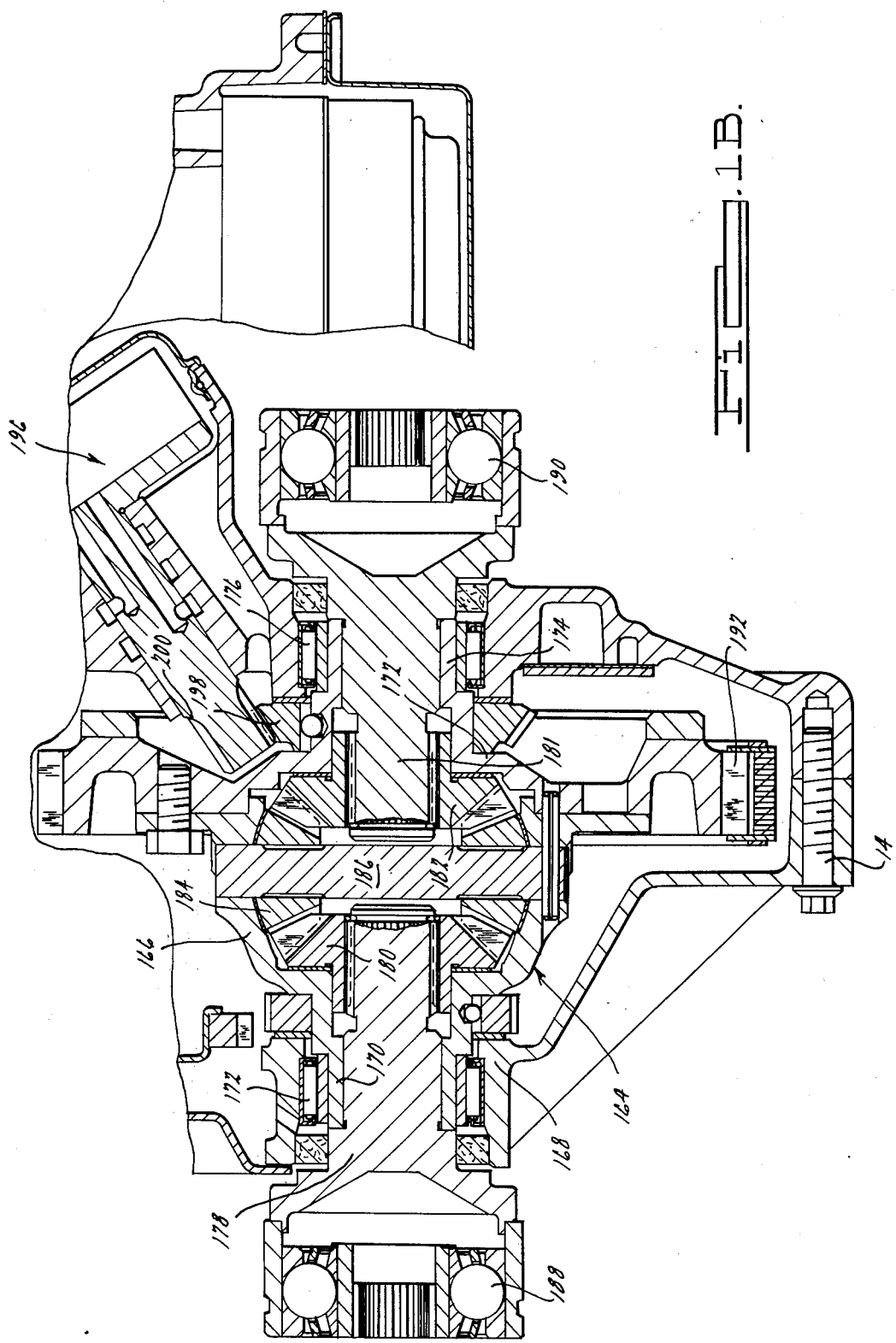
FIG. 1B shows the differential and output shaft assembly for the gearing arrangement of FIG. 1A.
Figures 2, 4:
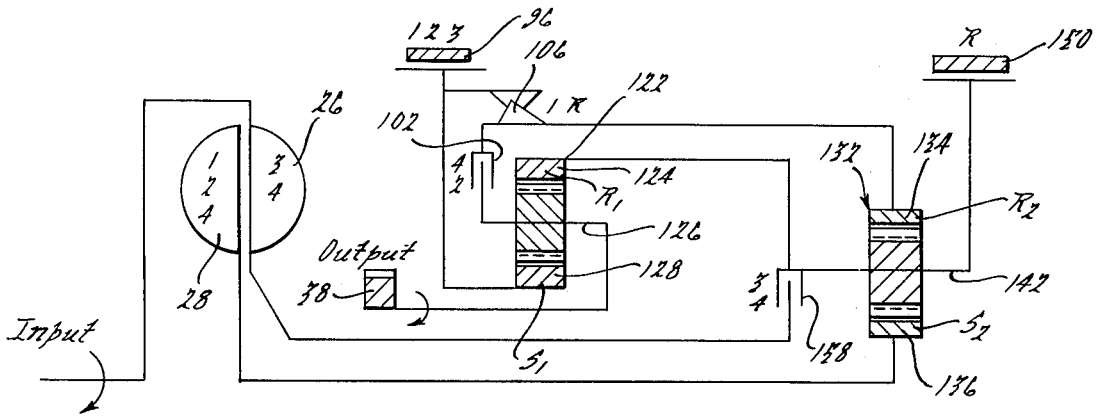
FIG. 2 is a schematic representation of the transmission structure of FIG. 1.
FIG. 4 is a chart showing the relationship of the elements of the gear units and typical gearing ratios for each of the forward and reverse driving ratios.

Numeral 10 indicates a main transmission housing. A converter housing portion of the transmission housing is shown at 12. It is bolted by a plurality of bolts 14 to the end face 16 of the housing 10. A transmission end wall 18 is secured by bolts 20 to the right-hand face 22 of the transmission housing 10.

A fluid coupling 24 in the housing portion 12 includes an impeller 26 and a turbine 28 located in fluid flow relationship. An impeller housing comprises two housing parts 30 and 32 joined together at the periphery to enclose the impeller and the turbine. The impeller housing 32 comprises a hub 34 which is supported in bearing recess 36 formed in power output drive sprocket 38. A suitable bearing surrounds the impeller shell hub 34.

The hub 40 of the impeller housing part 30 is piloted in central opening 42 formed in a circular adapter ring 44 which is bolted by bolts 46 to the engine crankshaft. Bolts 46 also form a driving connection between the crankshaft and impeller drive plate 48 which is secured by a threaded connector 50 to the outer margin of the impeller housing part 30. An engine end plate 52 is secured to the engine block by bolts 54 and it is provided with a central opening for retaining bearing 56 that surrounds the crankshaft. The transmission has a closure plate 58 that is secured to the outer margin 60 of the converter housing portion 12. It is provided with a central opening that receives oil seal 62 which surrounds adapter 44.

The impeller 26 includes a hub 64 that is splined to a central driveshaft 66. An outer impeller shroud 68 is secured to the hub 64 by means of a damper spring coupling 70.

Turbine 28 has a turbine hub 72 which is splined to turbine sleeve shaft 74. The hub is riveted or otherwise secured to the outer turbine shroud 76.

Power output drive sprocket 38 is connected to or formed integrally with power output sleeve shaft 78 which surrounds turbine shaft 74. Shaft 78 is journalled by bearing 80 within bearing support wall 82 which is secured by bolts 84 to the carburetor housing portion 12. Turbine shaft 74, in turn, is journalled within the shaft 78 by bushing 86.

The right-hand end of the central driveshaft 66 is journalled by bushing 88 within a bearing opening formed in the gear pump 90. The enclosure for the pump 90 is covered by a cover plate 92. The drive gear element of the pump 90 is connected driveably to the right-hand end of the driveshaft 66.

Brake drum 94 is surrounded by a multiple wrap brake band 96, which is adapted to be engaged during operation in the first three forward driving ratios. Brake drum hub 98 is journalled on a support sleeve 100, which forms a part of the support member 82. Multiple ratio clutch 102, which is engaged during operation in the fourth speed ratio and the second speed ratio, includes first discs that are splined to externally splined clutch member 104. This, in turn, is journalled on the hub 98 for the brake drum 94. An overrunning coupling 106, which includes an inner race connected to the clutch member 104, and the outer race 108 received within a side opening in the brake drum hub 98 establishes a one-way driving connection between the brake drum 94 and the clutch member 104. Other clutch discs which register with the clutch disc carried by the member 104 are externally splined to second clutch member 110 which defines an annular cylinder 112. An annular piston 114 is received in the cylinder 112. It cooperates therewith to define a pressure cavity which, when pressurized, causes the piston 114 to frictionally engage the clutch discs for clutch 102. The clutch disc backup member 116 also is carried by the clutch member 110.

Clutch member 110 is journalled on sleeve shaft extension 117 for the brake drum hub 98. Sun gear sleeve shaft 118 is journalled in the sleeve shaft extension 116 and sun gear 120 is formed integrally therewith. Sun gear 120 forms a part of a first planetary gear unit 122 which includes also a ring gear 124, a carrier 126 and planet pinions 128 journalled on the carrier 126. Carrier 126 forms a part of or is connected to the clutch member 110 and rotates in unison with it. The right-hand side of the carrier includes a pinion shaft support 130 which is splined to sleeve shaft 78 which serves as a torque output shaft. A second planetary gear unit is designated by reference character 132. Gear unit 132 includes a ring gear 134, a sun gear 136, planet pinions 138 which engage the ring and sun gears 134 and 136, respectively, and which are journalled on pinion shafts 140 which form a part of the carrier assembly 142. Carrier assembly 142 is connected driveably at 144 to the ring gear 124 for the gear unit 122. Sun gear 136 is splined to the right-hand end of turbine sleeve shaft 74. Carrier 142 and the pinion shafts 140 are connected drivably to clutch member 146 which is connected drivably at its margin to brake drum 148.

Brake drum 148 is surrounded by multiple wrap brake band 150 which is applied during operation in reverse drive ratio. Drum 148 defines an annular cylinder 152 which is journalled on stationary sleeve support 154. An annular piston 156 is received within the cylinder 152. It defines with the cylinder 152 a pressure chamber which when pressurized moves the piston into frictional driving engagement with clutch discs 158. These discs include separator plates splined externally to brake drum 148 and internally splined friction discs that are carried by an externally splined clutch member 160, the latter in turn being splined at 162 to the impeller driven driveshaft 66.

A power output differential drive mechanism is shown generally at 164. It includes a differential carrier housing 166 which is straddle mounted in a differential housing 168. For this purpose carrier housing 166 is formed with a bearing sleeve shaft extension 170 which is journalled by bearing 172 in a bearing opening formed in the housing 168. The carrier housing includes also a housing portion 172 and is bolted to the housing portion 166 and which is provided with a bearing sleeve shaft extension 174. A support bearing 176 journals the extension 174 in a bearing opening formed in the right-hand portion of the differential housing 168. The differential housing is formed by the main housing portion 10 and the converter housing portion 12.

A first output shaft 178 is splined to a differential side gear 180 located within the carrier housing 166. A second output shaft 181 is splined to the second differential side gear 182 also located in the carrier housing 166. Side gears 180 and 182 mesh with differential pinions 184 supported on pinion shaft 186 the ends of which are carried by the differential carrier 166. A universal joint 188 at the left hand end of the shaft 178 connects a first drive shaft with the output shaft 178 and a corresponding universal joint 190 located at the right-hand end of the other axle shaft 180 provides a driving connection with the opposite output shaft 181 for the vehicle.

Drive sprocket 192 is bolted to the carrier housing 166. A drive chain 194 is trained over the output sprocket 38 and the differential drive sprocket 192 and meshes with the sprocket teeth to form a driving connection between output shaft 78 and the carrier housing 166.

A fluid pressure governor assembly 196 is geared directly to the differential carrier 166. For this purpose a governor drive gear 198 is carried by the drive sprocket 192 and it meshes with drive pinion 200 for the governor assembly 196.

During operation in the first three forward driving ratios, brake band 96 is applied. Turbine torque from the fluid coupling 24 is applied to sun gear 136. The resulting torque on the ring gear 134 is distributed through overrunning coupling 106 to sun gear 128. Reaction torque on the carrier 142 is transferred directly to the ring gear 124. The resulting torque on the carrier 126 is distributed then to the output sprocket 38 and hence to the differential carrier sprocket 192. If it is assumed that the ratio of the diameter of ring gear 134 to the diameter of sun gear 136 is 1.84, and if it is assumed that the ratio of the diameter of the ring gear 124 to the diameter of the sun gear 128 is 1.87, a torque ratio during operation in the lowest speed range is 4.36.

Clutch 102 is applied to effect a ratio change to the second speed ratio. Overrunning coupling 106 freewheels under these conditions and brake band 96 remains applied. As in operation in the first speed ratio, turbine torque is delivered to the sun gear 136. Ring gear torque then is transferred directly to the carrier 126 from the ring gear 134 and the reaction torque on the carrier 142 is transferred to the ring gear 124. This produces an overall torque ratio 2.52:1 if it is assumed that the sun gear and ring diameter ratios are the same as those described previously.

To effect a change from the second speed ratio to the third speed ratio, clutch 158 is applied. This renders the fluid coupling ineffective since engine torque then is delivered directly through the clutch 158 to the ring gear 124. Brake band 96 remains applied thus allowing sun gear 128 to continue to act as a reaction member. Gear unit 132 is inactive under these conditions.

If it is assumed that the ratios of the ring gear diameters to the sun gear diameters are the same as those described previously, the overall ratio that is achieved in the transmission mechanism is 1.53:1 during operation in the third speed ratio. The torque flow path under these conditions is fully mechanical.

Fourth speed ratio operation is achieved by engaging simultaneously both clutches 158 and 102 and releasing brake band 196. Under these conditions carrier 142 acts as an input member thus overspeeding the sun gear 136, causing the turbine 28 to function as an impeller which drives the bladed member 26 which now acts as a turbine rather than as an impeller. A split torque delivery path is established. The torque that is developed hydrokinetically is transferred through the clutch 158 to the ring gear 124. The amount of that torque is one-half engine torque.

Reverse drive is achieved by engaging brake band 150 and releasing the clutches and the brake band 96. Again the fluid coupling acts in the usual way with the bladed member 26 functioning as an impeller and the bladed member 28 functioning as a turbine. Turbine torque is delivered to the sun gear 136. Ring gear torque on ring gear 134 is transferred through the engaged overrunning coupling 106 to the sun gear 128, which results in a reverse torque transfer to carrier 126 and the output sprocket 38.

During operation in fourth speed ratio the impeller acts as a turbine and the turbine acts as an impeller. This condition is illustrated in the diagram of FIG. 3A.

Figure 3A:
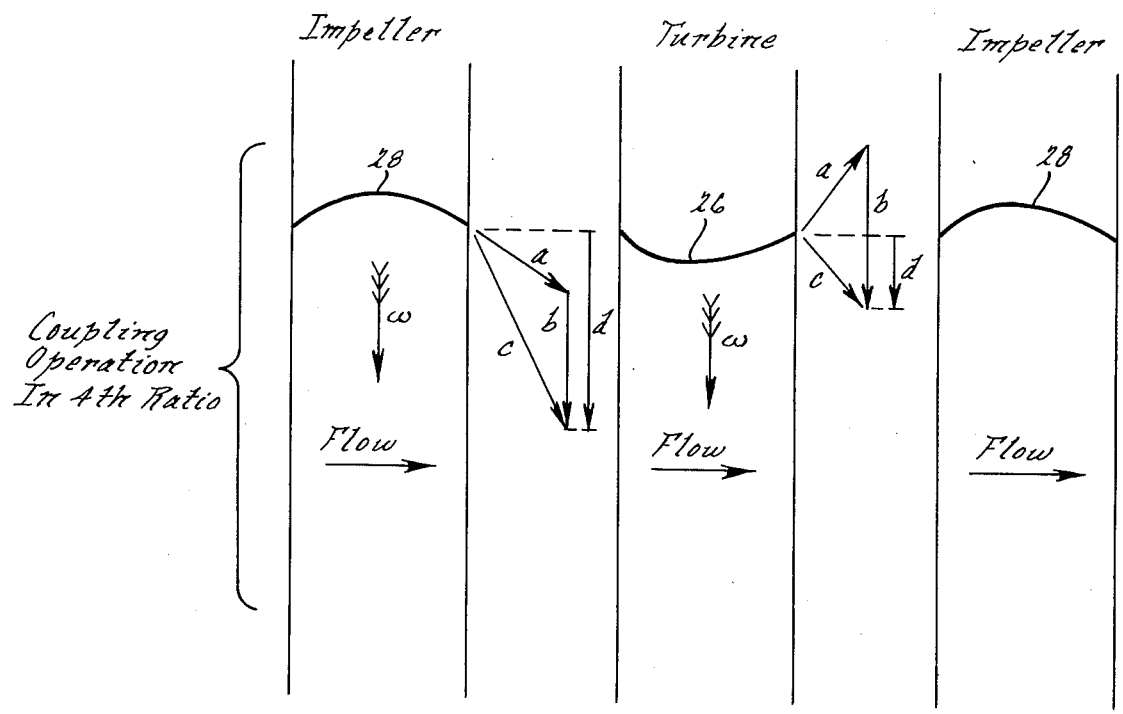
FIGS. 3A and 3B are a velocity vector diagram for fluid circulating in the torus circuit of the coupling used in the transmission of FIGS. 1A, 1B and 2.
Figure 3B:
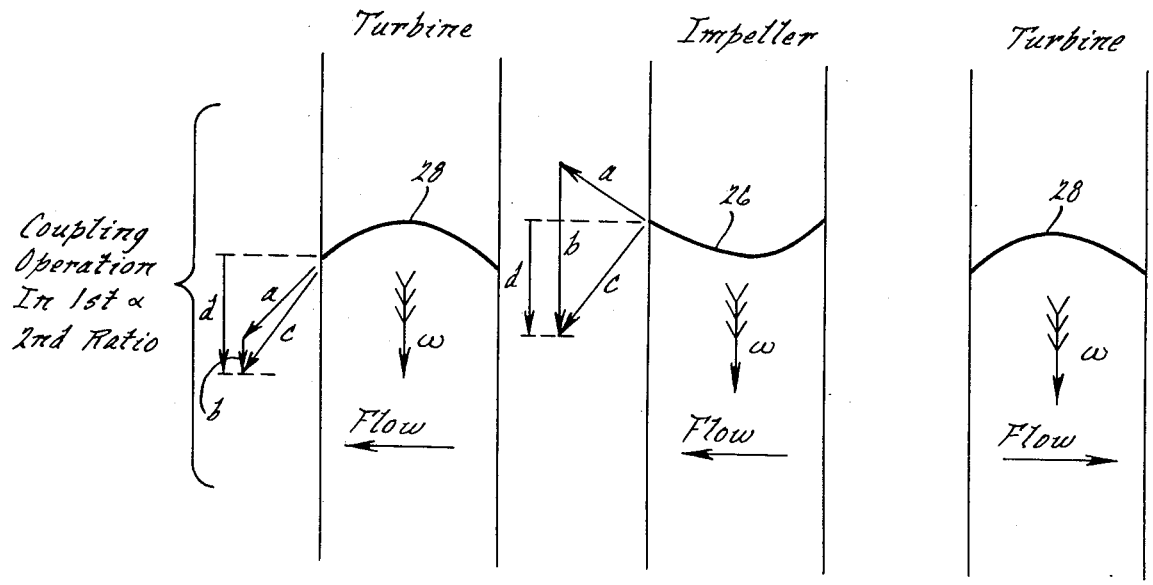

The blades of the impeller and the turbine are slanted in their respective shrouds so that when they are shown in an unwrapped cascade view in the plane of FIGS. 3A and 3B, they have entrance angles and exit angles approximately as shown. When the coupling operates in the fourth speed ratio condition, the flow is from left to right as indicated in FIG. 3A. The bladed member 28 acts as an impeller and the bladed member 26 acts as a turbine. In contrast, during operation in the first and second speed ratio the bladed member 28 acts as a turbine and the bladed member 26 acts as an impeller. In this instance the flow illustrated in FIG. 3B is from right to left.

By tilting the blades as shown, it is possible to provide a coupling with minimum slip during fourth speed ratio operation. For example, in FIG. 3A the blade angle at the flow exit region of the blade 28 produces a rotation vector in the tangential direction. This is shown at $b$ and the resultant or absolute flow velocity vector is shown at $c$. The tangential component of the absolute fluid flow velocity vector $c$ is shown at $d$. The corresponding vector components for a particle of fluid passing through the bladed member 28 and the bladed member 26 are shown in FIG. 3B. Note that the vector $d$ at the exit section of the bladed member 26 in FIG. 3B is substantially shorter than the vector $d$ at the exit section of the bladed member 28 in FIG. 3A.

The torque absorbed by the turbine is related to the change in the moment of momentum of the fluid that passes through the turbine, and hence is related quantitatively to the difference in the lengths of the vector $d$ at the exit section of the member 26 in FIG. 3B and the length of the vector $d$ at the exit section of the bladed member 28 in FIG. 3B. The difference in the lengths of these vectors $d$ in FIG. 3B is relatively slight compared to the difference in the lengths of the vectors $d$ at the flow exit regions of the bladed members 26 and 28, respectively, in FIG. 3A.

The slip that is present during operation of the coupling in the first speed ratio and second speed ratio is purposely increased by providing a blade angularity as shown in order that the coupling might operate with minimum slip during operation in the fourth speed ratio. This results in improved fuel economy during operation in the fourth speed ratio, which is the ratio in which most of the vehicle operation time occurs. To compensate for the increased impeller speed that results from the blade angularity shown in FIG. 3B, the diameter of the coupling can be increased slightly. This will reduce the slip during operation in the first and second speed ratio to a desirable value without adversely influencing the coupling efficiency during operation in the fourth ratio.

Having thus described a preferred embodiment of my invention, what I claim and desire to secure by U.S. Letters Patent is:

1. A multiple ratio power transmission mechanism having four forward driving speed ratios and a reverse speed ratio comprising two simple planetary gear units, each having a sun gear, a ring gear, a carrier and planet pinions journalled on carrier in meshing engagement with the sun and ring gears, a driving member, hydrokinetic coupling means for connecting drivably the driving member to the sun gear of the first of said gear units during operation in a first, second and a fourth forward driving speed ratio, a driven member connected to the carrier of the second of said gear units, first clutch means for connecting the driving member to the carrier of the first of said gear units during operation in the third and fourth forward driving ratios, second clutch means for connecting the ring gear of the first of said gear units to the carrier of the second of said gear units during operation in the fourth and second forward driving speed ratio, third clutch means for connecting the ring gear of the first of said gear units to the sun gear of the second of said gear units during operation in the first forward driving speed ratio and during operation in reverse drive, first brake means for anchoring the sun gear of the second of said gear units during operation in the first, second and third forward driving speed ratios, and other brake means for anchoring the carrier of the first of said gear units during operation in reverse drive ratio.

2. The combination as set forth in claim 1 wherein said third clutch means includes an overrunning coupling adapted to transfer driving torque from the ring of said first gear unit to the sun gear of said second gear unit during reverse drive operation and for transferring torque from the ring gear of said first gear unit to said first brake means during operation in first speed ratio.

3. The combination as set forth in claim 1 wherein said hydrokinetic coupling has a bladed impeller and a bladed turbine situated in toroidal fluid flow relationship, the impeller being connected mechanically to said driving member, said bladed members defining a toroidal fluid flow path, the flow exit angles at the fluid flow exit region of the impeller extending in a direction opposite to the direction of rotation of the impeller, the sun gear of said first planetary gear unit being adapted to deliver driving torque to said coupling during operation in the fourth forward driving speed ratio whereby the direction of toroidal fluid flow in said torus circuit is reversed relative to the direction of toroidal fluid flow during operation in the first and second forward driving ratios.

4. The combination as set forth in claim 2 wherein said hydrokinetic coupling has a bladed impeller and a bladed turbine situated in toroidal fluid flow relationship, the impeller being connected mechanically to said driving member, said bladed members defining a toroidal fluid flow path, flow exit angles at the fluid flow exit region of the impeller extending in a direction opposite to the direction of rotation of the impeller, the sun gear of said first planetary gear unit being adapted to deliver driving torque to said coupling during operation in the fourth forward driving speed ratio whereby the direction of toroidal fluid flow in said torus circuit is reversed relative to the direction of toroidal fluid flow during operation in the first and second forward driving ratios.

5. The combination as set forth in claim 1 wherein said driven member comprises a torque output drive sprocket, said drive sprocket being located between said hydrokinetic fluid coupling and said gear units, a sleeve shaft connecting said drive sprocket to the carrier of said second gear unit and a second sleeve shaft located in said first sleeve shaft drivably connecting the sun gear on said first gear unit to said fluid coupling.

6. The combination as set forth in claim 2 wherein said driven member comprises a torque output drive sprocket, said drive sprocket being located between said hydrokinetic fluid coupling and said gear units, a sleeve shaft connecting said drive sprocket to the carrier of said second gear unit and a second sleeve shaft located in said first sleeve shaft drivably connecting the sun gear on said first gear unit to said fluid coupling.

7. The combination as set fourth in claim 3 wherein said driven member comprises a torque output drive sprocket, said drive sprocket being located between said hydrokinetic fluid coupling and said gear units, a sleeve shaft connecting said drive sprocket to the carrier of said second gear unit and a second sleeve shaft located in said first sleeve shaft drivably connecting the sun gear on said first gear unit to said fluid coupling.

8. The combination as set forth in claim 4 wherein said driven member comprises a torque output drive sprocket, said drive sprocket being located between said hydrokinetic fluid coupling and said gear units, a sleeve shaft connecting said drive sprocket to the carrier of said second gear unit and a second sleeve shaft located in said first sleeve shaft drivably connecting the sun gear on said first gear unit to said fluid coupling.

9. The combination as set forth in claim 5 wherein said driven member forms a part of a differential gear mechanism having a differential carrier mounted for rotation about an axis parallel to the axis of rotation of said gear units, an output drive sprocket carried by said differential carrier, a drive chain connecting said drive sprockets, and side gears located in said carrier adapted to be connected to final drive axle shafts.

10. The combination as set forth in claim 6 wherein said driven member forms a part of a differential gear mechanism having a differential carrier mounted for rotation about an axis parallel to the axis of rotation of said gear units, an output drive sprocket carried by said differential carrier, a drive chain connecting said drive sprockets, and side gears located in said carrier adapted to be connected to the final drive axle shafts.

11. The combination as set forth in claim 7 wherein said driven member forms a part of a differential gear mechanism having a differential carrier mounted for rotation about an axis parallel to the axis of rotation of said gear units, an output drive sprocket carried by said differential carrier, a drive chain connecting said drive sprockets, and side gears located in said carrier adapted to be connected to the final drive axle shafts.

12. The combination as set forth in claim 8 wherein said driven member forms a part of a differential gear mechanism having a differential carrier mounted for rotation about an axis parallel to the axis of rotation of said gear units, an output drive sprocket carried by said differential carrier, a drive chain connecting said drive sprockets, and said gears located in said carrier adapted to be connected to the final drive axle shafts.

* * * * *